W. D. SMITH.
Cultivators.
No. 133,387.  Patented Nov. 26, 1872.
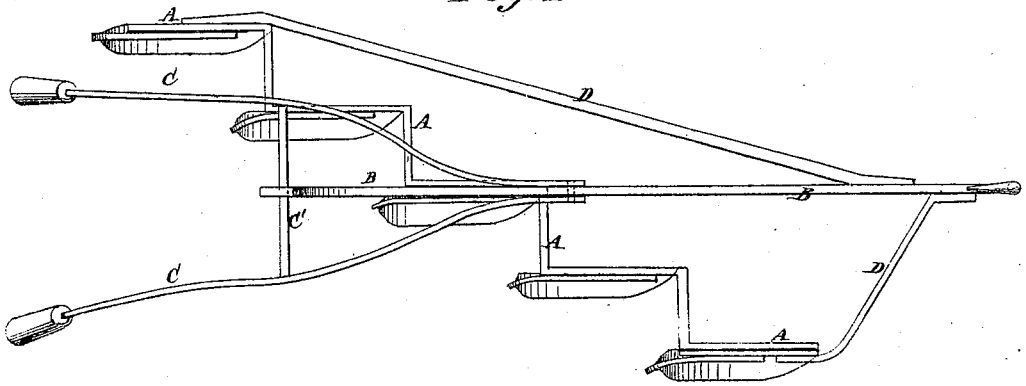
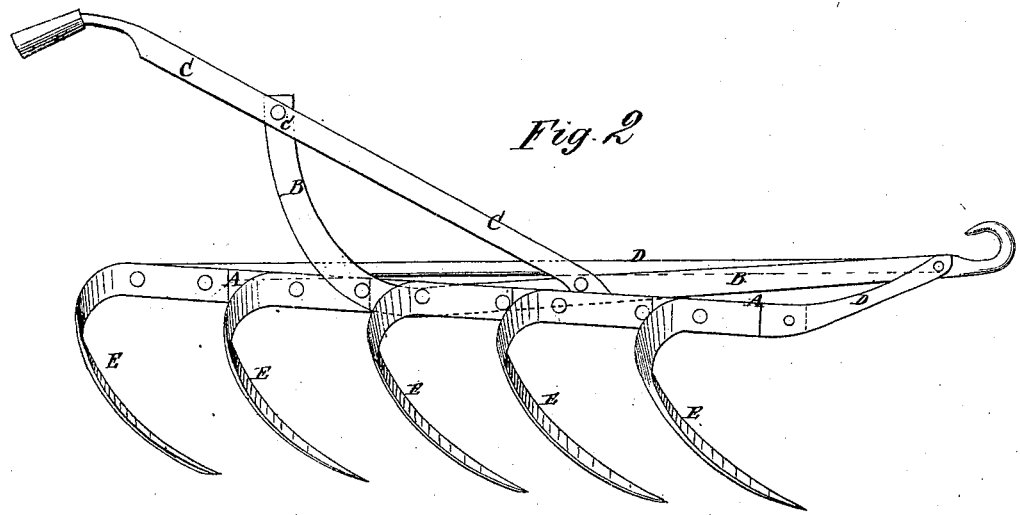

UNITED STATES PATENT OFFICE.

WILLIAM D. SMITH, OF HOMERVILLE, GEORGIA.

IMPROVEMENT IN CULTIVATORS.

Specification forming part of Letters Patent No. 133,387, dated November 26, 1872.

*To all whom it may concern:*

Be it known that I, WILLIAM D. SMITH, of Homerville, in the county of Clinch and State of Georgia, have invented a new and useful Improvement in Cultivator, of which the following is a specification:

Figure 1 is a top view of my improved cultivator. Fig. 2 is a side view of the same.

Similar letters of reference indicate corresponding parts.

My invention has for its object to furnish an improved cultivator, which shall be so constructed as to stir up and loosen the soil to any desired depth without turning up the fertilizer to the surface to have its gases evaporated by the rays of the sun; and it consists in the construction and combination of the various parts of the cultivator, as hereinafter more fully described.

A is the bar or beam to which the plows are attached, and which is made in zigzag form, as shown in Fig. 1, to form shoulders or offsets for the attachment of the plows. The bar or beam A may be made in one or more parts or pieces, and its middle part is attached to the bar B, to the forward end of which the draft is applied. The rear part of the draft bar or beam B is bent or curved upward, and has a hole formed in its upper end to receive the round $c'$ that connects the handles C and holds them in their proper relative positions. The forward ends of the handles C are secured to the draft bar or beam B. The ends of the zigzag bar or beam A are supported by the brace-rods D, the rear ends of which are secured to the ends of the said bar or beam A, and their forward ends are secured to the forward part of the draft bar or beam B. E are the plows, the shanks or upper ends of which are attached to the shoulders or offsets of the bar or beam A. The plows E are made long and narrow, are curved or bent downward and forward, and are twisted so that their forward sides may be slightly inclined, as shown in Fig. 2, to allow the soil to slide off the said plows as they are drawn forward, thus enabling them to stir up the soil thoroughly and move it toward or from the plants, as may be desired. The zigzag bar or beam A may be made of any desired length, and may have any desired number of shoulders or offsets for the attachment of plows. If desired, another or second inclined zigzag bar or beam may be inclined in the opposite direction from the bar or beam A, giving the frame-work a V-form. In this case a double plow should be placed at the center or point where the two bars A meet to turn the soil to the right and left to open the center or alley furrow. A fender or wheel may be attached to the draft-bar B to gage the depth to which the plows are desired to enter the ground.

Having thus described my invention, I claim as new and desire to secure by Letters Patent—

An improved cultivator formed by the combination of the zigzag bar A, made in one or more parts or pieces, the draft-bar B, handles C, braces D, and plows E with each other, substantially as herein shown and described, and for the purposes set forth.

WILLIAM DURNALL SMITH.

Witnesses:
    E. T. DAKES,
    C. F. MATTOX.